(12) United States Patent
Boutaghou

(10) Patent No.: US 6,799,365 B2
(45) Date of Patent: Oct. 5, 2004

(54) PROCESS OF MANUFACTURING A DISC DRIVE SLIDER WITH BAR REDUCING LOAD/UNLOAD DAMAGE

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/179,086

(22) Filed: Jun. 25, 2002

(65) Prior Publication Data

US 2003/0169535 A1 Sep. 11, 2003

Related U.S. Application Data

(60) Provisional application No. 60/362,324, filed on Mar. 6, 2002.

(51) Int. Cl.[7] .............................. G11B 5/187; G03C 5/00
(52) U.S. Cl. ............................... 29/603.12; 29/603.16; 29/603.18; 29/DIG. 16; 216/41; 216/22; 430/320; 430/396
(58) Field of Search ........................ 29/603.12, 603.08, 29/603.15, 603.16, 603.18, DIG. 16; 430/320, 396; 216/41, 48, 22; 360/122, 125

(56) References Cited

U.S. PATENT DOCUMENTS

| 5,062,017 A | 10/1991 | Strom et al. ............. 360/236.1 |
| 5,200,056 A * | 4/1993 | Cohen et al. ........ 29/603.15 X |
| 5,329,689 A | 7/1994 | Azuma et al. ........... 29/603.07 |
| 5,334,467 A * | 8/1994 | Cronin et al. ........... 430/320 X |
| 5,343,343 A | 8/1994 | Chapin .................... 360/236.1 |
| RE35,477 E | 3/1997 | Hussinger et al. ....... 29/603.07 |
| 6,311,388 B1 | 11/2001 | Berg et al. ............... 29/603.12 |
| 6,483,668 B2 | 11/2002 | Hipwell et al. .......... 360/235.9 |
| 2001/0034564 A1 | 10/2001 | Jones ......................... 700/166 |
| 2001/0040766 A1 | 11/2001 | Yotsuya ................... 360/236.1 |
| 2002/0197936 A1 | 12/2002 | Smith ........................... 451/41 |
| 2003/0192167 A1 | 10/2003 | Beckle et al. ............ 29/603.12 |

FOREIGN PATENT DOCUMENTS

JP          62-1552     *   1/1987  ............. 430/320 X

* cited by examiner

Primary Examiner—A. Dexter Tugbang
(74) Attorney, Agent, or Firm—Westman, Champlin & Kelly (57) ABSTRACT

A manufacturing process of a disc drive slider has one or more bars with dull ends as a protection feature to prevent contact between peripheral edges of an air bearing surface and a disc surface when the slider is misaligned with the disc surface. The dull ends can be formed by a process of undercutting a resist layer during etching.

23 Claims, 8 Drawing Sheets

PROCESS OF MANUFACTURING A DISC DRIVE SLIDER WITH BAR REDUCING LOAD/UNLOAD DAMAGE

CROSS-REFERENCE TO RELATED APPLICATION

This application claims priority benefits from U.S. Provisional Application 60/362,324 titled "Air Bearing Concept to Reduce/Eliminate Head Disk Load/Unload Damage," filed Mar. 6, 2002.

FIELD OF THE INVENTION

The present invention relates generally to sliders for use in disc drives. In particular, the present invention relates to reducing or eliminating damaging contact between a slider and a disc in a disc drive.

BACKGROUND OF THE INVENTION

During hundreds of thousands of slider load/unload operations in a disc drive, it is found that there will be a scratch or damage to the disc surface, sometimes referred to as a "ghost" contact. These ghost contacts are believed to occur when a slider is misaligned relative to a disc surface or lands on a particle of contamination on the disc surface in the range of approximately 0.1–2 micrometers in diameter. These ghost contacts have a length that is typically approximately the length of the slider itself. These ghost contacts damage the disc and result in lost data.

A method and apparatus are needed to reduce or eliminate the damage due to these ghost contacts.

SUMMARY OF THE INVENTION

Disclosed are a disc drive slider and a method for making the slider. The slider can be rotatably attached to a suspension for flying over an air bearing layer.

The slider comprises a slider substrate that has sidewall surfaces that include side edge surfaces and a trailing edge surface. The slider also has an air bearing surface that includes a peripheral edge. A read/write head is deposited on the trailing edge surface.

The slider also includes one or more bars as a protection feature. The bar are disposed between one or more of the sidewall surfaces and the peripheral edge. The bar has a dull end that contacts the disc surface when the slider is misaligned with the disc surface. The bar prevents damaging contact between the peripheral edge and the disc surface.

These and various other features as well as advantages that characterize the present invention will be apparent upon reading of the following detailed description and review of the associated drawings.

DETAILED DESCRIPTION OF ILLUSTRATIVE EMBODIMENTS

In the embodiments described below, a disc drive slider and method for making a disc drive slider are disclosed. The slider includes one or more bars that have dull, rounded ends. The dull end of the bar can prevent damaging contact between sharp edges on the slider and a disc surface when the slider is misaligned. Protection is provided even when the rotation is substantially either about the roll axis or the pitch axis at any particular time, and also when there is both roll and pitch rotation at the same time.

Figure 1:
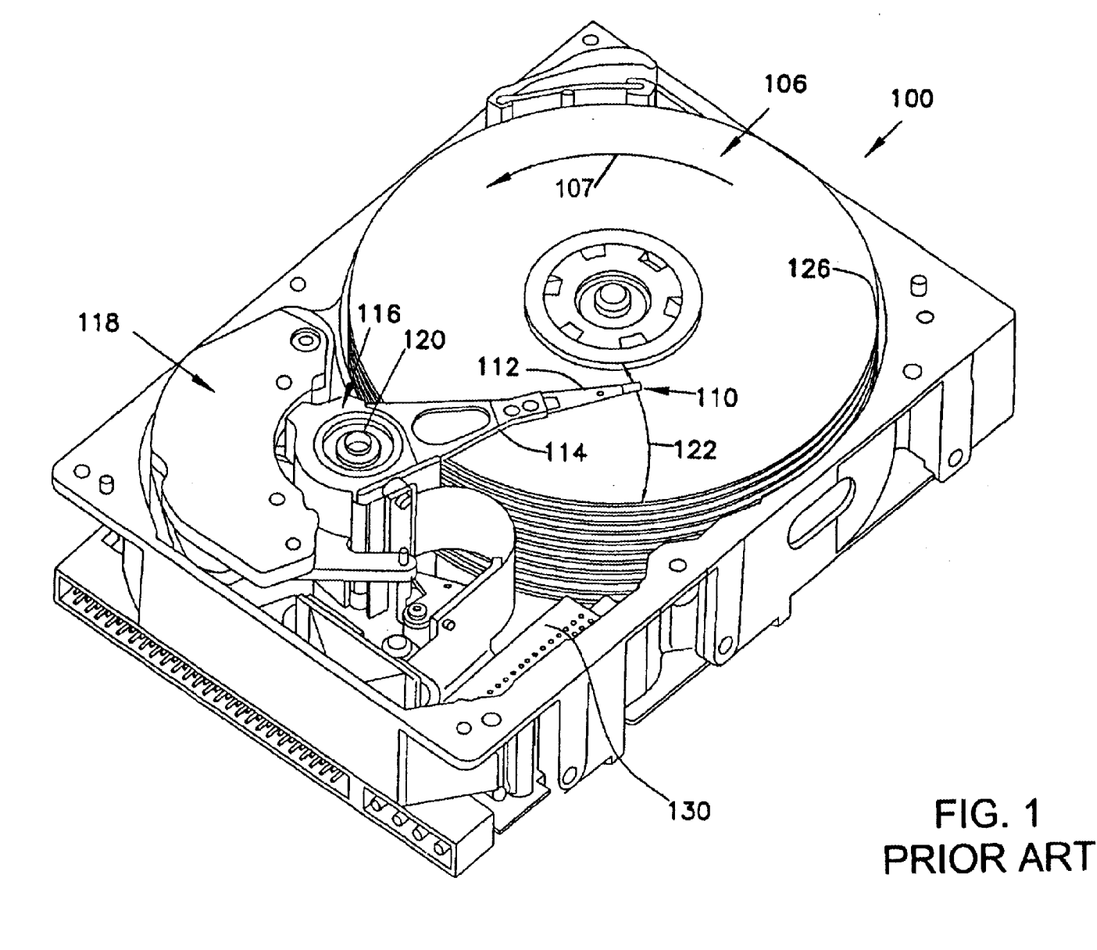
FIG. 1 illustrates a top isometric view of a PRIOR ART disc drive.

FIG. 1 illustrates an embodiment of a PRIOR ART disc drive 100 including a slider or head 110 that includes one or more read/write transducers. Disc drive 100 includes a disc pack 126 having storage media surfaces (disc surfaces) 106 that are typically layers of magnetic material. The disc pack 126 includes a stack of multiple discs. A head suspension assembly 112 includes the slider 110 with a read/write transducer for each stacked disc. Disc pack 126 is spun or rotated as shown by arrow 107 to allow head suspension assembly 112 to access different rotational locations for data on the storage surfaces 106 on the disc pack 126.

The head suspension assembly 112 is actuated to move radially, relative to the disc pack 126, as shown by arrow 122 to access different radial locations for data on the disc surfaces 106 of disc pack 126. Typically, the actuation of the head suspension assembly 112 is provided by a voice coil motor 118. Voice coil motor 118 includes a rotor 116 that pivots on axle 120 and an arm or beam 114 that actuates the head suspension assembly 112. The head suspension assembly 112 presses down on a central gimbal point on the slider 110, providing a load force that holds the slider 110 in close proximity to the storage surface 106. One or more read/write transducers are deposited on the slider 110 and fly above the disc surface 106 at a fly height. A circuit at location 130 provides an electric current to the voice coil motor 118 to control the radial position of the slider 110 and electrically interfaces read/write transducers on slider 110 with a computing environment.

The slider 110 is rotatably attachable to the head suspension 112 and flies over an air bearing layer subject to contamination by particles that can rotate the slider 110 as the particles pass between the slider 110 and the disc surface 106 in the disc drive 100. The slider 110 includes a protection feature that protects the disc surface 106 from damage when the slider rotates as a particle passes between the slider 110 and the disc surface 106. The slider 110 can also become misaligned relative to the disc surface 106 during loading/ unloading operations, and the protection feature can also protect the disc surface during loading/unloading operations. The protection feature is explained in more detail below in connection with FIGS. 2–10.

Figure 2:
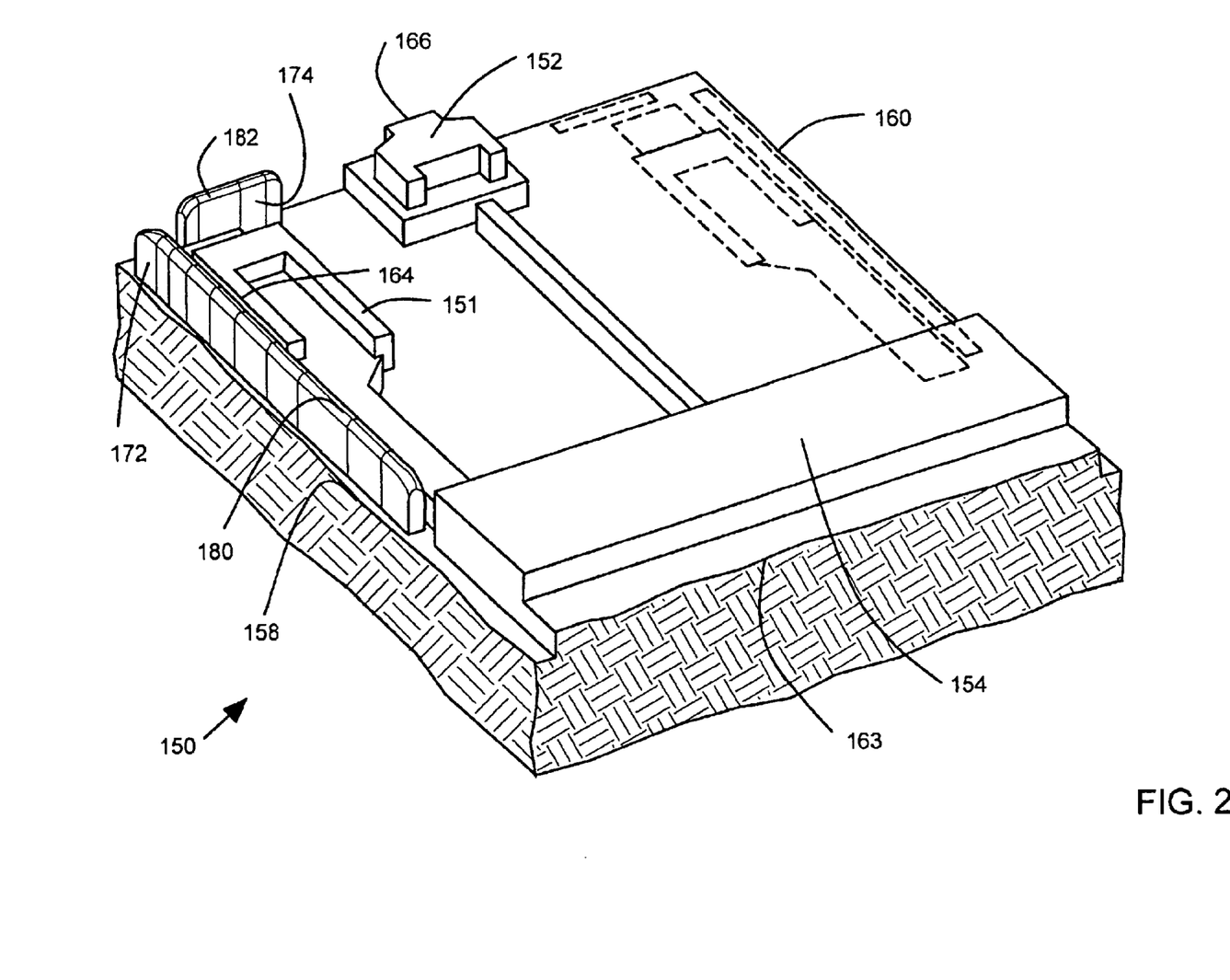
FIG. 2 schematically illustrates an oblique view of an air bearing surface of a disc drive slider.
Figure 3:
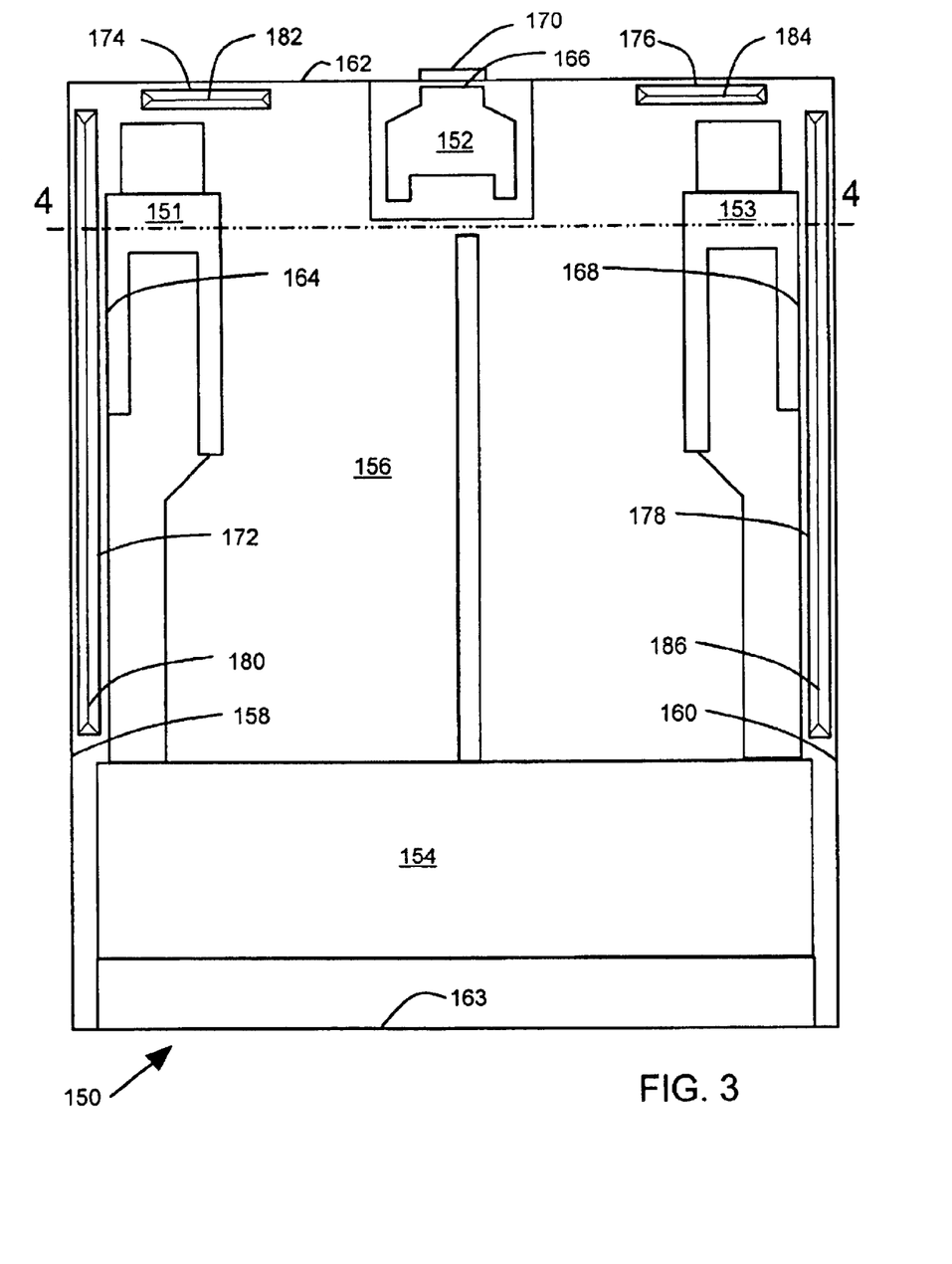
FIG. 3 schematically illustrates a plan view of an air bearing surface of a disc drive slider.

FIGS. 2–3 schematically illustrate a disc drive slider 150 that includes air bearing surfaces 151, 152, 153, 154. The slider 150 is rotatably attachable to a suspension for flying over an air bearing layer that is subject to contamination by particles. The particles can rotate the slider as the particles pass between the slider and a disc surface in a disc drive, particularly during loading and unloading of the slider 150 on the disc surface. There can also be misalignment during loading and unloading of the slider 150 when a particle is not present between the slider 150 and the disc surface. The rotational attachment can be accomplished using any of a number of conventional gimbal mounting arrangements between the slider 150 and a suspension.

The slider 150 includes a slider substrate 156 that has sidewall surfaces 158, 160, 162, 164 that include side edge surfaces 158, 160 and a trailing edge surface 162. The air bearing surfaces 151, 152, 153 each have respective peripheral edges 164, 166, 168. The peripheral edges 164, 166, 168 are typically sharp corners that could, if protection were not provided, damage a disc surface if the slider 150 were rotated by passing over a particle of contamination during operation. The slider also includes a read/write head 170 that is deposited on the trailing edge surface 162.

A plurality of bars 172, 174, 176, 178 are disposed between one of the adjacent sidewall surfaces 158, 162, 160 and the peripheral edges 164, 166, 168. The bars 172, 174, 176, 178 each have a distal dull, rounded end 180, 182, 184, 186 that contacts the disc surface when the slider 150 rotates as a particle passes between an air bearing surface 151, 152, 153, 154 and the disc surface, or when the slider 150 is misaligned during loading/unloading operations. The bars 172, 174, 176, 178 prevent damaging contact between a peripheral edge 164, 166, 168 and the disc surface. In some applications, the bars 172, 174, 176, 178 can further prevent damaging contact between the sidewall surfaces 158, 160, 162 and the disc surface. In most applications, a protection bar is not needed along a leading edge 163 because the normal spring bias provided by the suspension effectively prevents contact between the leading edge surface 163 and the disc drive surface, however, as explained below in connection with FIG. 10, a protection bar may be provided along the leading edge 163. The dull ends 180, 182, 184, 186 provide a Hertzian contact with the flat disc drive surface. Damaging contact between the disc drive surface and sharp, angled edges 162, 164, 166, 168 or irregular edges on surfaces 158, 160 is avoided. The dull ends 180, 182, 184, 186 are made by a process that is explained in more detail below in connection with an example illustrated in FIGS. 4–5.

Figure 4:
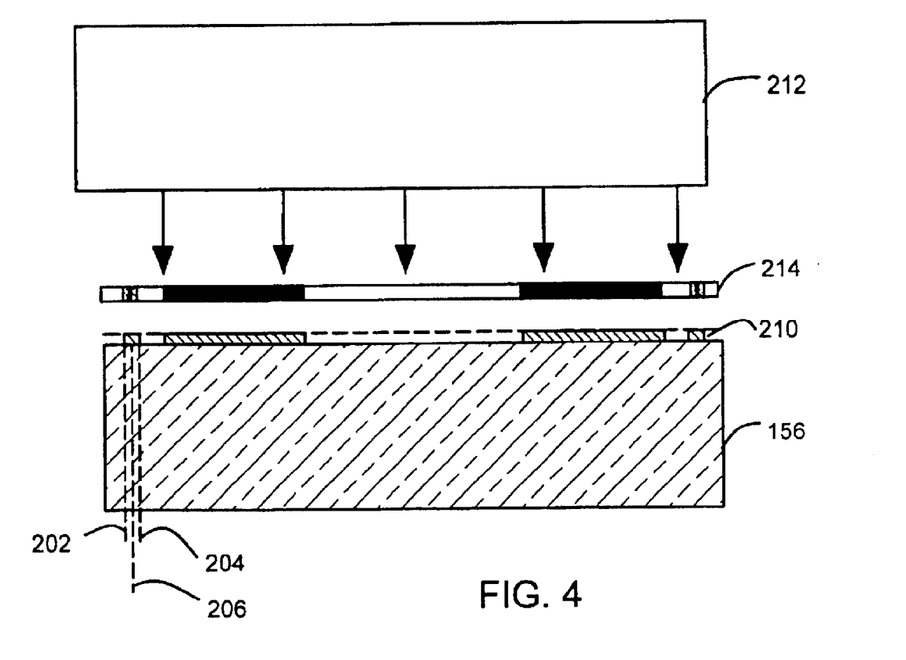
FIG. 4 schematically illustrates a sectional view of a slider along line 4—4 in FIG. 3 showing a developed portion of a resist layer prior to etching.
Figure 5:
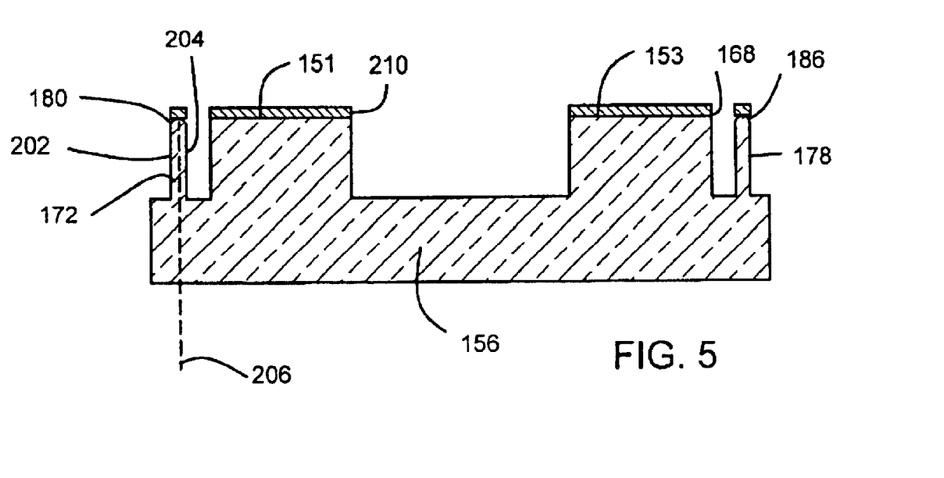
FIG. 5 schematically illustrates a sectional view of the a slider along line 4—4 in FIG. 3 showing an etched slider.

FIG. 4 schematically illustrates a sectional view of the slider substrate 155 along line 4—4 in FIG. 3 showing a developed portion of a resist layer prior to etching. FIG. 5 schematically illustrates a sectional view of the a slider along line 4—4 in FIG. 3 showing the slider 150 after etching. A microstructure manufacturing process is used that provides the dull end 180, 182, 184, 186. The dull end 180 extends from a bar edge 202 to a bar edge 204 and passes through a bar centerline 206.

A resist layer 210 is deposited over the slider substrate. A radiation source 212 is provided that is capable of altering ("curing") the resist layer during an exposure time. A mask 214 is provided between the radiation source 212 and the resist layer 210. The mask 214 has an opacity pattern that gradually varies from a higher opacity level to a lower opacity level between the bar centerline 206 and the bar edge 202, 204. The radiation source 212 is turned on for a selected exposure time T needed to cure the resist layer 210. The curing varies gradually from a more complete alteration to a less complete alteration of the resist layer between the bar centerline 206 and the bar edges 202, 204. The alteration of the resist layer 210 changes the ease with which the resist layer 210 can be eroded during a subsequent etching step.

In a development step, a first portion the resist layer 210 (illustrated by a dashed line in FIG. 4) is rinsed away (developed), leaving a second developed portion of the resist layer (illustrated in cross section in FIG. 4) that is adhered to the slider substrate over the bar 172. The second developed portion is weakened over the bar 172 because of the incomplete curing in a previous step as explained above.

The slider substrate 156 is then etched. The etching undercuts the weakened, second developed portion of the resist layer to form the dull end as illustrated in FIG. 5. The undercutting takes place because the resist layer 210 is weakened by underdevelopment over the bar 172. The bar 172 is dull because etchant can reach the top of the bar 172 by way of the undercutting.

After etching is complete, the second, developed portion of the resist layer 210 is removed.

The gradually varying opacity of the mask can comprise a dot screen pattern, a gray scale pattern or other know patterns of varying mask opacity. Various types of exposure systems can be used, and the mask may be in contact with the resist layer during the exposure time or spaced apart from the resist layer during the exposure time depending on the equipment being used. An image of the mask is projected on the resist layer. Depending on the equipment being used, the radiation source can produce ultraviolet light, X rays, or an electron beam. Either a positive or negative type of resist can be used for resist layer 210, with the mask being either a negative or positive mask as needed to match the type of resist being used. Enlarged cross sectional views of the developed portion of the resist layer 210 and the dull end 180 are shown in FIGS. 6–7.

Figure 6:
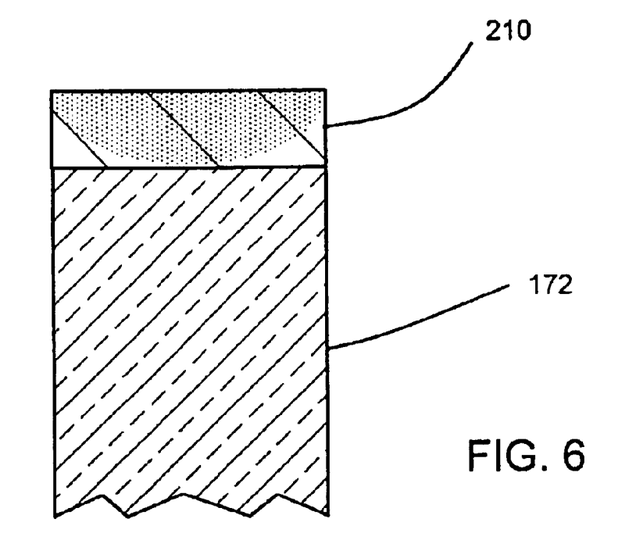
FIG. 6 schematically illustrates a close up view of a resist layer on a bar after partial etching.
Figure 7:
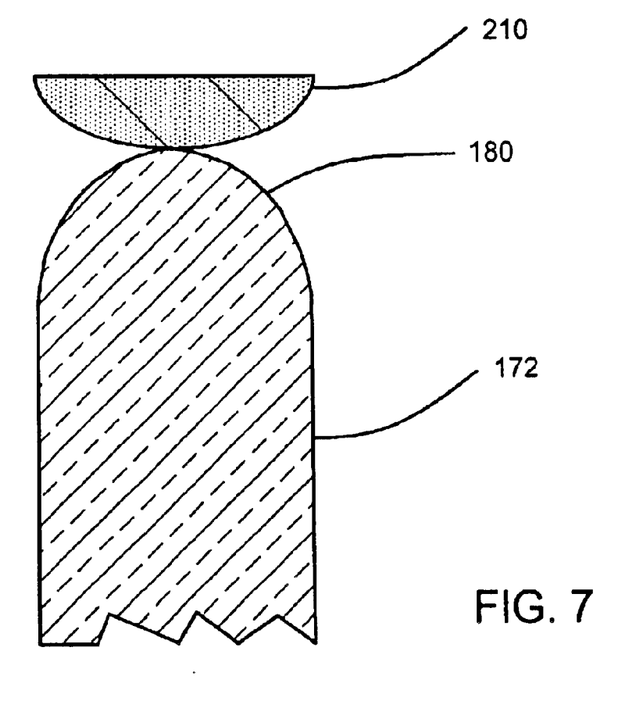
FIG. 7 schematically illustrates a closeup view of a resist layer on a bar after etching is complete.

FIG. 6 schematically illustrates a close up view of a developed portion of resist layer 210 on the bar 172 after partial etching. FIG. 7 schematically illustrates a closeup view of a developed portion of the resist layer 210 on the bar 172 after etching is complete. Portions of the resist layer 210 that are not completely cured allow the edges of the resist layer 210 to be eroded or undercut during etching. The undercutting allows etchant to remove material from the end of bar 172, leaving a dull end 180 that serves a protection feature.

Figure 8:
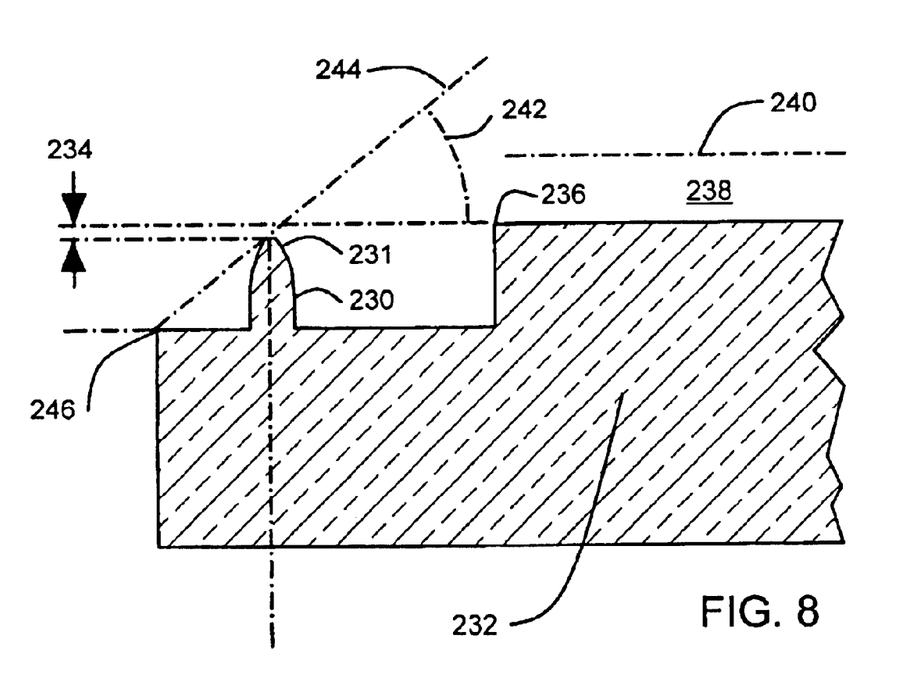
FIG. 8 schematically illustrates a bar that is recessed relative to an air bearing surface and a maximum tilt angle relative to a disc surface.

FIG. 8 schematically illustrates a slider 232 that includes a bar 230 that has a dull end 231 that is recessed by a recess spacing 234 relative to an air bearing surface 236. Under normal operating conditions, the slider 232 flies over an air bearing layer 238 between the air bearing surface 236 and a disc surface 240. When a particle of contamination passes between the disc surface 240 and the air bearing surface 236, the slider 232 is rotated or tipped at a rotation angle 242 relative to a disc surface at 244. As can be seen by inspection of FIG. 8, the bar 230, which has a dull end 231 provide protection up to a maximum value of the rotation angle 242. If that maximum value is exceeded, then there is danger of a corner 246 of a sidewall contacting and damaging the disc surface at 244.

In one preferred arrangement, the bar 230 is arranged to provide protection for slider rotations with rotation angles up to 11 degrees. In another preferred arrangement, the bar 230 has a height of 2–3 micrometers, is recessed from the air bearing surface 236 by 0.1–0.2 micrometers, and is centered approximately 10 micrometers from the corner 246. One or more of the protection bar 230 can disposed along the trailing edge surface, along side edge surfaces or both.

Protection can be provided for rotations about a roll axis, a pitch axis or both simultaneously to handle a variety of ways in which the slider 232 may be misaligned relative to the disc surface 240. The bars can be arranged in symmetrical patterns and have substantially the same profile or cross sectional shape.

Figure 9:
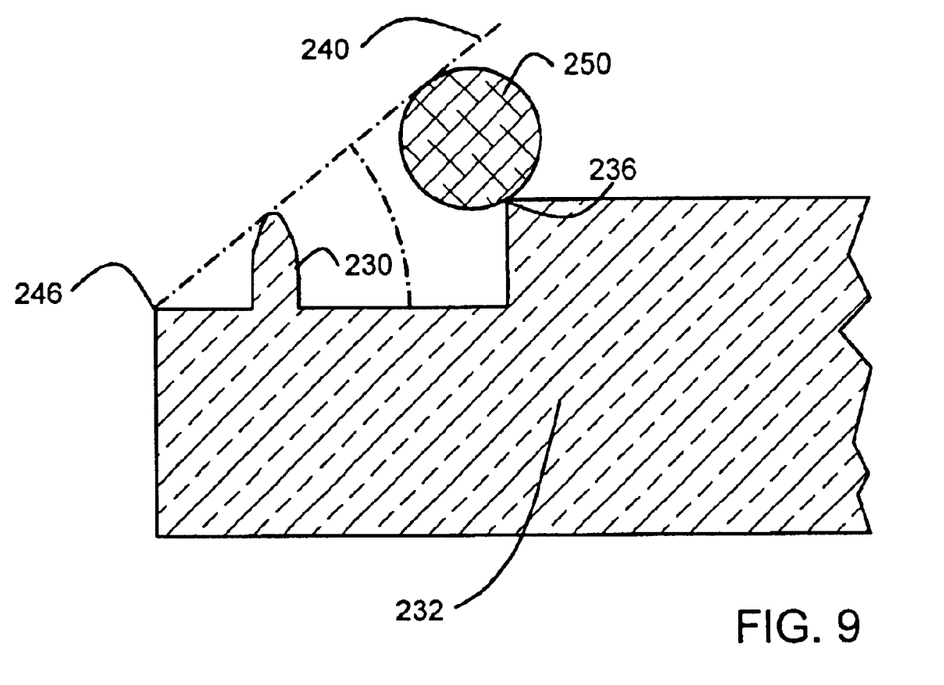
FIG. 9 schematically illustrates a particle lodged between a corner of an air bearing surface and a disc surface.

FIG. 9 schematically illustrates a 2.8 micrometer diameter particle 250 lodged between a corner of the air bearing surface 236 and the disc surface 244. In FIG. 9, the edge 246 is approximately 25 microns from the corner of the air bearing surface 236. In FIG. 9, bar 230 provides protection for contamination particles with a diameter of 2.8 micrometer or less.

Figure 10:
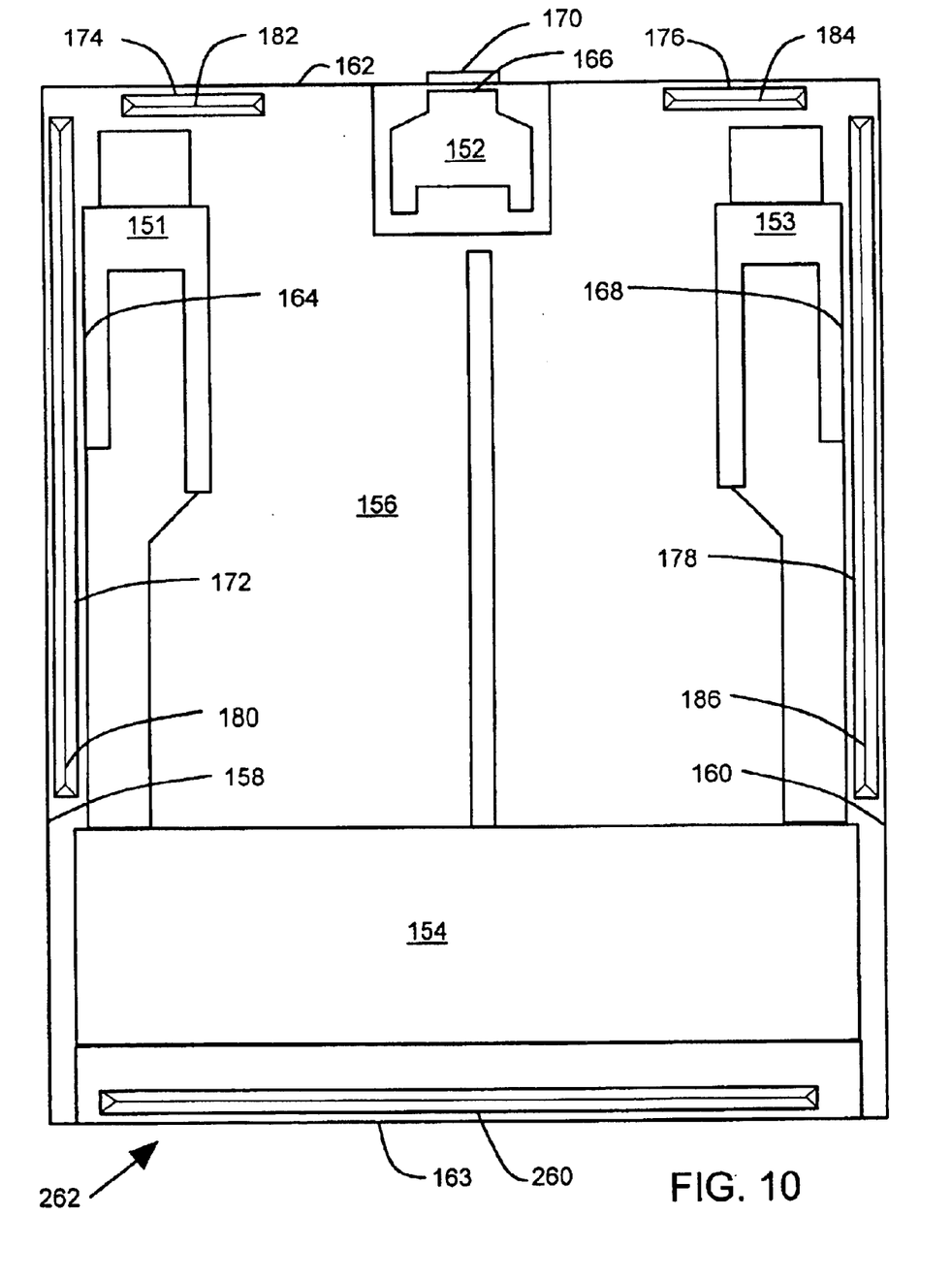
FIG. 10 schematically illustrates a plan view of an alternate air bearing surface of a disc drive slider that includes a bar on a leading edge.

FIG. 10 schematically illustrates a plan view of an alternate air bearing surface of a disc drive slider 262 that includes a bar 260 on a leading edge 163. In other respects, the slider 163 in FIG. 10 is similar to the slider 150 in FIG. 3, and reference numbers in FIG. 10 that are the same as reference numbers in FIG. 3 identify the same or similar features. The slider shown in FIG. 10 can be used in applications where the slider 262 is suspended by a suspension that permits the leading edge 163 to be misaligned and contact a disc surface.

In summary, a disc drive slider (150, 262) can be rotatably attached to a suspension (112) for flying over an air bearing layer (238) over a disc surface (240, 244). The slider (150, 262) comprises a slider substrate (156) that has sidewall surfaces (158, 160, 162, 163) that include side edge surfaces (158, 160) and a trailing edge surface (162). The slider also has air bearing surfaces (151, 152, 153) that includes peripheral edges (164, 166, 168). A read/write head (170) is deposited on the trailing edge surface. The slider also includes one or more bars (172, 174, 176, 178) as a protection feature. Each bar is disposed between one or more of the sidewall surfaces and the peripheral edge. Each bar has a dull end (180, 182, 184, 186) that contacts the disc surface when the slider rotates as a particle passes between the air bearing surface and the disc surface. The bar prevents damaging contact between the peripheral edge and the disc surface.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular disc drive application while maintaining substantially the same functionality without departing from the scope and spirit of the present invention. For example, the bars may be of different lengths and shaped provided that they have dull ends for contacting the disc surface. In addition, although the preferred embodiment described herein is directed to a thin film magnetic head, it will be appreciated by those skilled in the art that the protection feature can be used on heads of different design including optical and magnetoopic heads. The teachings of the present invention can be applied to other applications, like tape drives, without departing from the scope and spirit of the present invention.

What is claimed is:

1. On a slider substrate, a process for providing a dull end on a bar that has a bar edge surrounding a bar centerline, the process comprising:

adhering a resist layer over the slider substrate;

providing a radiation source capable of altering the resist layer during an exposure time;

providing a mask between the radiation source and the resist layer, the mask having an opacity pattern that gradually varies from a higher opacity level to a lower opacity level between the bar centerline and the bar edge;

selecting the exposure time to cure the resist layer, the curing varying gradually from a more complete alteration to a less complete alteration of the resist layer between the bar centerline and the bar edge;

rinsing away a first portion of the resist layer, leaving a second developed portion of the resist layer that is adhered to the slider substrate over the bar;

etching the slider substrate, the etching undercutting the second developed portion of the resist layer to form the dull end; and removing the second developed portion of the resist layer.

2. The process of claim 1 wherein the gradually varying opacity of the mask comprises a dot screen pattern.

3. The process of claim 1 wherein the gradually varying opacity of the mask comprises a gray scale pattern.

4. The process of claim 1 wherein the mask is in contact with the resist layer during the exposure time.

5. The process of claim 1 wherein the mask is spaced apart from the resist layer during the exposure time and an image of the mask is projected on the resist layer.

6. The process of claim 1 wherein the radiation source produces ultraviolet light.

7. The process of claim 1 wherein the radiation source produces X rays.

8. The process of claim 1 wherein the radiation source produces an electron beam.

9. The process of claim 1 wherein the resist layer comprises a positive resist.

10. The process of claim 1 wherein the resist layer comprises a negative resist.

11. The process of claim 1 further comprising: shaping the dull end to provide Hertzian contact with a flat disc surface.

12. The process of claim 1 further comprising: weakening the less complete alteration of the resist layer by underdevelopment.

13. The process of claim 1 further comprising: stopping the etching of the slider substrate when the bar has a height in the range of 2 to 3 micrometers.

14. A process, comprising:

adhering a resist layer over a slider substrate;

masking the resist layer with a mask having a gradually varying opacity level;

radiating the resist layer with a radiation source during an exposure time;

selecting the exposure time to cure the resist layer to vary gradually according to the varying opacity level;

rinsing away a first portion of the resist layer, leaving a second developed portion of the resist layer on the slider substrate;

etching the slider substrate, the etching undercutting the second developed portion of the resist layer to form a dull end; and removing the second developed portion of the resist layer.

15. The process of claim 14 wherein the gradually varying opacity level comprises a dot screen pattern.

16. The process of claim 14 wherein the gradually varying opacity level comprises a gray scale pattern.

17. The process of claim 14 wherein the mask is in contact with the resist layer during the exposure time.

18. The process of claim 14 wherein the mask is spaced apart from the resist layer during the exposure time and an image of the mask is projected on the resist layer.

19. The process of claim 14 wherein the radiation source produces ultraviolet light.

20. The process of claim 14 wherein the radiation source produces X rays.

21. The process of claim 14 wherein the radiation source produces an electron beam.

22. The process of claim 14 wherein the resist layer comprises a positive resist.

23. The process of claim 14 wherein the resist layer comprises a negative resist.

\* \* \* \* \*